US012795396B2

(12) United States Patent
Yu et al.

(10) Patent No.: US 12,795,396 B2
(45) Date of Patent: Nov. 10, 2026

(54) METHOD AND APPARATUS FOR OPTIMIZING HYBRID COMMUNICATION

(71) Applicant: KT CORPORATION, Gyeonggi-do (KR)

(72) Inventors: Hyun Yu, Gyeonggi-do (KR); Sung-Hoon Seo, Gyeonggi-do (KR); Mi-Sun Ahn, Gyeonggi-do (KR); Ho-Joon Won, Gyeonggi-do (KR); Won-Dong Yun, Gyeonggi-do (KR); Eun-Ji Hwang, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 714 days.

(21) Appl. No.: 18/207,652

(22) Filed: Jun. 8, 2023

(65) Prior Publication Data

US 2023/0403576 A1 Dec. 14, 2023

(30) Foreign Application Priority Data

Jun. 8, 2022 (KR) ........................ 10-2022-0069622

(51) Int. Cl.
*H04W 24/02* (2009.01)
*H04W 28/02* (2009.01)
*H04W 84/06* (2009.01)

(52) U.S. Cl.
CPC ....... *H04W 24/02* (2013.01); *H04W 28/0268* (2013.01); *H04W 84/06* (2013.01)

(58) Field of Classification Search
CPC . H04W 24/02; H04W 28/0268; H04W 84/06; H04W 48/18; H04W 88/06;
(Continued)

(56) References Cited

U.S. PATENT DOCUMENTS

2013/0077501 A1* 3/2013 Krishnaswamy ....... H04L 45/24 370/252
2017/0339257 A1* 11/2017 Kanagarathinam ... H04L 45/124
(Continued)

FOREIGN PATENT DOCUMENTS

KR 10-2017-0142513 A 12/2017
KR 10-2018-0088248 A 8/2018

OTHER PUBLICATIONS

Byung Chul Kim et al., "Design of Congestion Control for Performance Improvement of MPTCP in High BDP Multipath Networks", Journal of Information Technology and Applied Engineering, 2020, pp. 21-27, vol. 10, No. 2.

*Primary Examiner* — Abdullahi Ahmed
(74) *Attorney, Agent, or Firm* — IP Legal Services, LLC

(57) ABSTRACT

Provided are a method and apparatus for dynamically controlling the number of sub-flows in a satellite network included in hybrid communication network. The method may include: obtaining service requirement information for supporting communication between a service server and a user equipment (UE) through a hybrid communication network including a satellite network and a cellular network, where the service requirement information is information on service requirements related to the service server and the service requirement information includes a guaranteed network speed and an allowed latency; and controlling (adjusting) a number of sub-flows of the hybrid communication network based on the service requirement information and service performance information, where the service performance information includes a current network speed and a current latency in communication between the service server and the UE.

17 Claims, 8 Drawing Sheets

(58) Field of Classification Search
CPC ......... H04W 28/0236; H04W 28/0257; H04W 84/042; H04L 47/283; H04L 69/14
See application file for complete search history.

(56) References Cited

U.S. PATENT DOCUMENTS

| | | | | |
|---|---|---|---|---|
| 2020/0029382 | A1* | 1/2020 | Cullerot | H04W 76/12 |
| 2020/0098251 | A1* | 3/2020 | Laselva | H04L 45/121 |
| 2020/0245162 | A1* | 7/2020 | Dion | H04W 40/14 |
| 2021/0135978 | A1* | 5/2021 | Nemirovsky | H04L 45/12 |
| 2023/0217310 | A1* | 7/2023 | Zhang | H04W 40/18<br>370/252 |

* cited by examiner

METHOD AND APPARATUS FOR OPTIMIZING HYBRID COMMUNICATION

BACKGROUND

The present disclosure relates to optimizing hybrid communication using heterogenous communication networks. In particular, the present disclosure relates to dynamically controlling the number of sub-flows in a hybrid communication network including a satellite network and a cellular network.

A hybrid communication network is a network that combines two or more different communication technologies and protocols to provide a single, unified, and flexible network for transmitting data, voice, and multimedia contents. For example, a typical hybrid communication network is a network using LTE, 5G, and WIFI technologies for transmitting data, voice, and multimedia content. Such a hybrid communication network offers improved performance, increased reliability, and enhanced security.

Multi-path transmission control protocol (MPTCP) has been introduced. MPTCP is a protocol that enables simultaneous transmission of data over multiple network paths. For example, it allows a single TCP connection to use multiple network interfaces or paths, such as Wi-Fi, Cellular networks, or wired connections, to transmit data. MPTCP has been applied to transmit data over the hybrid communication network.

A hybrid communication network combines two or more different networks, and each network has a network delay different from the other. Such a network delay may be referred to as transmission delay, latency, response time, network latency, packet delay, propagation delay, processing delay, or a round-trip time (RTT). If such network delay between two different networks in a hybrid communication network, MPTCP enables the optimization of communication performance of a hybrid communication network. For example, there is no significant network delay between two networks in a hybrid communication network when the hybrid communication network is built by combining a LTE network and a WiFi network or combining a 5G network and a WiFi network.

However, when a hybrid communication network is built by merging heterogeneous networks with significant network delay differences, MPTCP does not optimize the communication performance of the hybrid communication network. For example, merging heterogeneous networks with significant network latency differences includes combinations of an LTE network and a satellite network or combination of a 5G network and a satellite network. This is because MPTCP operates based on transmission control protocol (TCP), and an important factor affecting TCP performance is a round trip time (RTT). While the latency of LTE and 5G networks ranges from 10 to 30 ms, the latency of satellite networks can be between 500 ms to 800 ms. LTE and 5G networks can provide sufficient performance using TCP. However, satellite networks often exhibit very low actual performance compared to the allocated bandwidth (e.g., speed). For instance, despite a theoretical allocation of up to 100 Mbps for the satellite network, the TCP performance can be as low as 10 Mbps due to latency (e.g., RTT). Consequently, the merging performance of heterogeneous networks (e.g., hybrid communication networks) can be severely limited.

SUMMARY

In accordance with an aspect of the present embodiment, a method and apparatus may be provided for optimizing the performance of hybrid communication using multiple networks by dynamically adjusting (e.g., controlling) the number of sub-flows, taking into consideration characteristics of multiple networks such as a satellite network and a cellular network.

In accordance with another aspect of the present embodiment, a method and apparatus may be provided for enhancing merging performance of multiple networks in hybrid communication by considering the specific characteristics of satellite networks.

In accordance with one embodiment, a method may be provided for optimizing hybrid communication using a plurality of heterogeneous networks. The method may include: obtaining (acquiring, collecting, receiving, providing) service requirement information for supporting communication between a service server and a user equipment (UE) through a hybrid communication network including a satellite network and a cellular network, where the service requirement information is information on service requirements related to the service server and the service requirement information includes a guaranteed network speed and an allowed latency; and controlling (adjusting) a number of sub-flows of the hybrid communication network based on the service requirement information and service performance information, where the service performance information includes a current network speed and a current latency in communication between the service server and the UE.

The controlling a number of sub-flows may include controlling a number of sub-flows in a satellite network included in the hybrid communication network.

The controlling a number of sub-flows in a satellite network may include determining whether to change the number of sub-flows in the satellite network using service performance information collected in a previous cycle and service performance information collected in a current cycle.

The determining whether to change the number of sub-flows may include: determining to change the number of sub-flows in the satellite network in an event that the number of sub-flows in the satellite network was not changed in the previous cycle.

The determining whether to change the number of sub-flows may include: determining to change the number of sub-flows in the satellite network in an event that performance variation between the service performance information collected in the previous cycle and the service performance information collected in the current cycle is greater than a predetermined threshold value.

The controlling a number of sub-flows in a satellite network may include: determining to decide increasing the number of sub-flows in the satellite network in an event that the current network speed is slower than the guaranteed network speed and the current latency is shorter than or equal to the allowed latency.

The controlling a number of sub-flows in a satellite network may include: determining an increment value for the number of sub-flows in the satellite network using the current network speed and the current latency.

The increment value may be determined to be higher as the current network speed decreases and as the current latency decreases.

The determining an increment value may include using an occupancy rate of the cellular network in communication between the service server and the UE with the current network speed and the current latency.

The increment value may be determined to be higher as the occupancy rate of the cellular network increases.

The controlling a number of sub-flows in a satellite network may include determining to decrease the number of sub-flows in the satellite network in an event that the current latency is slower than the allowed latency, and the current network speed is faster than the guaranteed network speed.

The controlling a number of sub-flows in a satellite network may include determining not to decrease the number of sub-flows in the satellite network in an event that the current latency is shorter than the allowed latency and the current network speed is slower than the guaranteed network speed.

The controlling a number of sub-flows in a satellite network may include: determining whether to decrease the number of sub-flows in the satellite network using the occupancy rate of the cellular network in communication between the service server and the UE in an even that the current latency is shorter than the guaranteed latency and the current network speed is faster than the guaranteed network speed.

The determining whether to decrease the number of sub-flows in the satellite network using the occupancy rate of the cellular network may include: determining to decrease the number of sub-flows in the satellite network in an event that the occupancy rate of the cellular network is greater than a predetermined threshold value.

In accordance with another embodiment, an apparatus may be provided for optimizing communication in a hybrid communication network including heterogenous networks. The apparatus may include: an input port configured to receive inputs from an external device; a memory configured to store data and information; a main processor configured to control overall operations; a communication circuit including a satellite communication processor and a cellular communication processor, configured to obtain service requirement information for supporting communication between a service server and a user equipment (UE) through a hybrid communication network including a satellite network and a cellular network, where the service requirement information is information on service requirements related to the service server and the service requirement information includes a guaranteed network speed and an allowed latency; and a sub-flow control processor configured to control (adjusting) a number of sub-flows of the hybrid communication network based on the service requirement information and service performance information, where the service performance information includes a current network speed and a current latency in communication between the service server and the UE.

DETAILED DESCRIPTION OF EMBODIMENTS

In accordance with one embodiment, an apparatus that enables user equipment to communicate with a service server through a hybrid communication network including a satellite network and a cellular network. Such an apparatus collects i) service requirements information related to a service or a service network that the user equipment subscribes to or belongs to and ii) service performance information of the hybrid communication network. The apparatus dynamically controls the number of sub-flows in the hybrid communication network based on the service requirements information and the service performance information.

According to the embodiment, the performance of hybrid communication utilizing a multi-network consisting of a satellite network and a cellular network is optimized by reflecting the characteristics of the satellite network.

Figure 1:
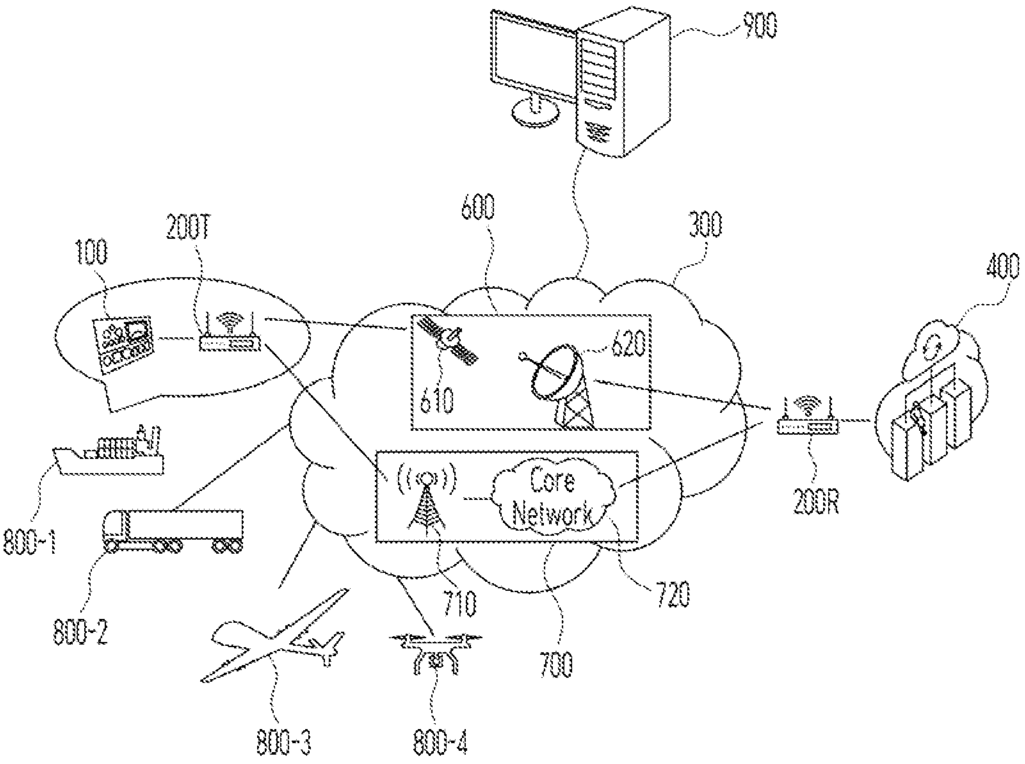
FIG. 1 is a diagram illustrating a hybrid communication network including a satellite network and a cellular network.

Hereinafter, such an apparatus for optimizing hybrid communication and a method thereof in accordance with one embodiment will be described with reference to FIG. 1. FIG. 1 is a diagram illustrating a hybrid communication network including a satellite network and a cellular network.

Referring to FIG. 1, hybrid communication network 300 may be a network that combines multiple different types of network technologies and architectures to meet specific requirements and optimize performance. Further, hybrid communication network 300 supports communication based on the multipath transport control protocol (MPTCP). MPTCP is a transport layer protocol than enhances communication performance by creating multiple paths within a single MPTCP session using multiple communication interface with different IP (Internet Protocol) addresses, allowing parallel transmission of traffic. The multiple paths supported by MPTCP are also referred to as sub-flows. Furthermore, hybrid communication network 300 utilizing multiple networks includes satellite network 600 and cellular network 700. Hybrid communication network 300 may allocate some sub-flows to satellite network 600 and others to cellular network 700 due to its support for heterogeneous networks.

Cellular network 700 may be a telecommunications network, such as a mobile network or a wireless network, that allows mobile devices, user equipment, such as smartphones, tablets, and IoT devices, to connect and communicate with each other over long distances. Cellular network 700 may use various wireless communication technologies, such as global system for mobile communication (GSM), code division multiple access (CDMA), Long-term evolution (LTE), Fifth generation (5G), new radio (NR), and similar technologies. Cellular network 700 may be an LTE network or a 5G network in accordance with one embodiment.

Cellular network 700 may include base station 710 equipped with antennas and radio transceivers that transmit and receive signals to and from mobile devices (e.g., UE 100) and core network 720 that may be connected to base station 710 through backhaul networks and enables data transmission between cells and the rest of the telecommunications infrastructure.

Satellite network 600 may be a telecommunications network that uses satellites to enable communication over large distances. Satellite network 600 may involve the use of satellites places in orbit around the Earth to transmit and receive signals between different points on the planet. Satellite network 600 may include i) satellite 610 equipped with transponders, antennas, and other communication equipment, which receives signals from ground stations, amplifies them, and retransmits them back to Earth, and ii) satellite center 620 equipped with large antennas that send and receive signals to and from satellites.

Hybrid communication managing server 900 may be a computer system that overall manages communication services, resources, and functionalities of hybrid communication network 300 to other servers, computers, or devices on hybrid communication 300. In accordance with an embodiment, hybrid communication managing server 900 may collect various types of information on hybrid communication network 300 including satellite network 600 and cellular network 700 and provide the collected information at least one of UE 100, hybrid router 200, and service server 400 in an event of receiving a request.

Service server 400 may be a computer system that manages communication, resources, and functionalities to provide predetermined services to computers or devices (e.g., UE 100). For example, service server 400 may employ mobile edge computing (MEC) technology and provide various services for navigation, communication, controlling unmanned vehicles, autonomous driving, in-flight entertainment systems, and so forth. Here, MEC is a distributed computing paradigm that brings computation and data storage closer to the edge of the network, near the source of data generation. In edge computing, instead of sending all data to a centralized could or data center for processing, some or all of the processing is done at the network edge, closer to where the data is produced or consumed.

Service server 1300 may have service policies and provide predetermined services according to the service policies. For example, service server 1300 may provide services that allow passengers to access the internet in an airplane. In this case, service server 1300 may provide passengers with appropriate speed and quality internet services according to the service policies for service networks.

That is, service server 1300 may provide computing resources at an edge of a network. Service server 1300 may provide services using computing resources at an edge of a network. For example, service server 1300 may provide a VR service, an AR service, a self-driving car service, a navigation service, a communication service, a service for controlling unmanned vehicles, an autonomous driving service, and an in-flight entertainment service.

For example, service server 400 may provide predetermined services to devices (e.g., UE 100) that register at and subscribe to the predetermined service. Further, service server 400 may provide a service network and enable the devices to access for receiving the predetermined services.

For example, such a service network may be used to support communication within a transportation vehicle. Passengers may be enabled to access the internet, make a phone call, or send text messages. In addition, the service may be a communication between devices within a transportation vehicle. For example, the in-flight entertainment system used in an airplane communicates with the passenger's device through a predetermined service network to provide content to the passenger.

The service network may be also used to improve the safety and efficiency of transportation vehicles. For example, the service network is used to track the location of transportation vehicles, monitor the status of transportation vehicles, and support communication between transportation vehicles to prevent collisions between transportation vehicles.

UE 100 may be an electron device having i) communication capability for communicating with other devices through hybrid communication network 300 and receiving data for a predetermined service which is registered at and subscribed to from service server 400 and ii) processing capability for processing the received data from service server 400 and provide the predetermined service to user. For example, user equipment (UE) 100 may include a computer, a smart phone, a tablet, a wearable device, and any portable device equipped with a processor, a memory, a screen (e.g., monitor or display) and a communication module. UE 100 may form a service network with other related user equipment to provide a predetermined service under control of service server 400 in accordance with an embodiment.

UE 100 may be disposed, located, installed at predetermined transportation vehicles such as airplanes 800-3, urban air mobility (UAM) 800-4, ships 800-1, cars 80-2, and truck 800-2. For example, UE 100 may be installed or boarded in transportation vehicles. UE may include in-flight entertainment systems used in airplanes, navigation systems used in cars, and passenger information systems used in trains.

In accordance with an embodiment, UE 100 may access hybrid router 200T to access hybrid communication network 300 including satellite network 600 and cellular network 700. Hybrid router 200T may enable user device 100 to communicate with service server 400 through hybrid communication network 300 in accordance with one embodiment.

Hybrid router 200T may perform a router function by using communication protocols related to heterogeneous networks included in hybrid communication network 300. For example, hybrid router 200T may create traffic paths to hybrid router 200R (e.g., hybrid gateway) directly connected to service server 1300 and transmit/receive traffic to hybrid router 200R through hybrid communication network 300.

In accordance with an embodiment, hybrid router 200T may be disposed in front of UE 100 that forms a service network and supports communication between UE 100 in the service network and service server 400 through hybrid communication network 300. For example, hybrid router 200T may perform packet reordering, packet scheduling, tunneling, sub-flow management, and network performance management. The packet scheduling is a process of dividing the traffic and transmitting the divided traffic through multiple sub-flows when UE 100 transmits traffic to service server 400 through hybrid communication network 300. Packet reordering is a process of assembling traffic received through multiple sub-flows when UE 100 receives traffic from service server 400.

Hybrid router 200R is connected to service server 400, which is an opposite end of hybrid router 200T. In this case, hybrid router 200R may be referred to as a hybrid gateway. Hybrid router 200R may have the same structure and perform the same functions of hybrid router 200T. For convenience of description and ease of understanding, hybrid router 200 is described separately as hybrid router 200T and hybrid router 200R. However, the embodiments are not limited thereto.

Hybrid router 200R may generate a communication path with hybrid router 200T and transmit and receive traffic through the communication paths of hybrid communication network 300. For example, hybrid router 200R may be installed in front of service server 400 to support communication between service server 400 and UE 100 through hybrid communication network 300.

Hybrid router 200R may perform packet reordering, packet scheduling, tunneling, sub-flow management, and network performance management, which are like those of hybrid router 200T. Here, packet scheduling is a process of dividing traffic and sending it through multiple sub-flows when the service server 1300 sends traffic to UE 100. Packet reordering is a process of assembling traffic received through multiple sub flows when service server 400 receives traffic from UE 100.

Figure 2:
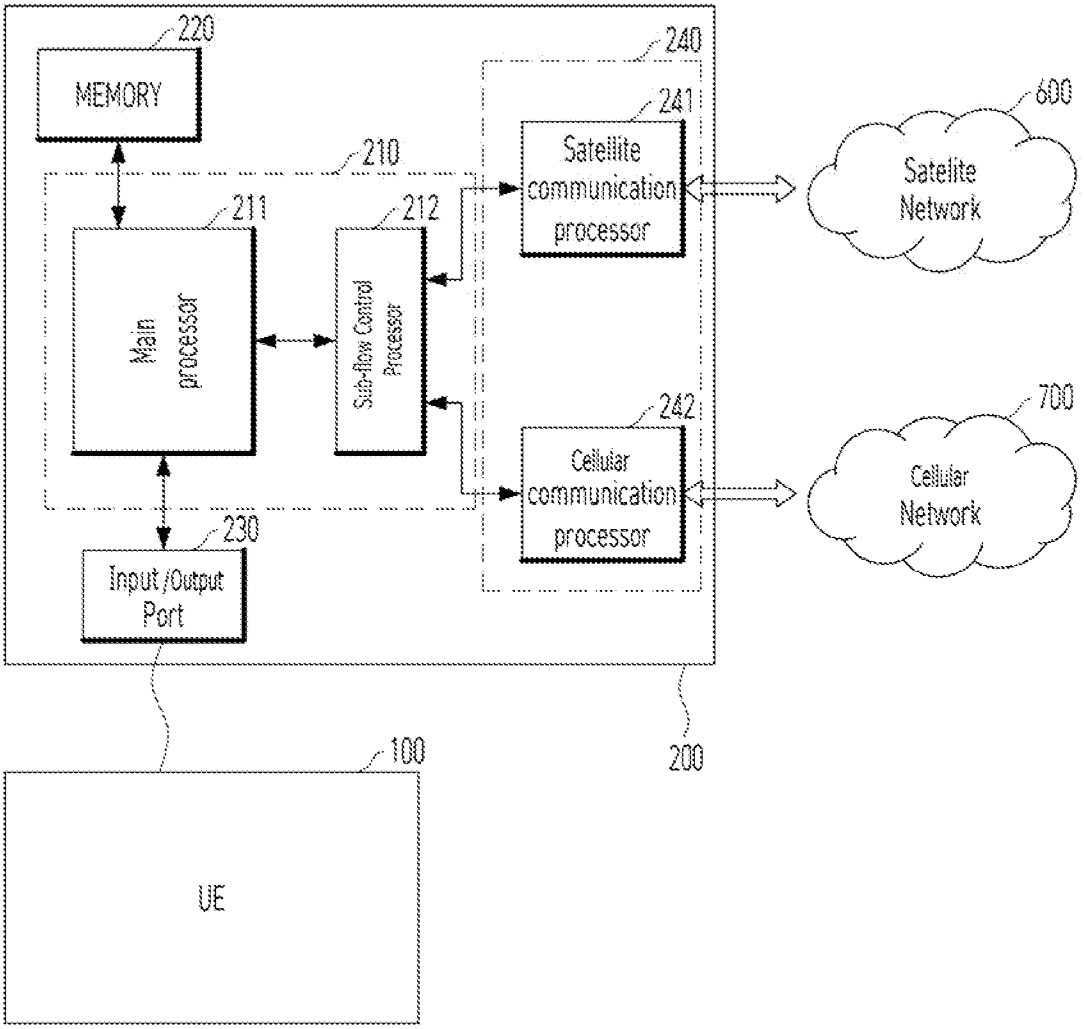
FIG. 2 is a diagram illustrating an apparatus for dynamically controlling the number of sub-flows in a hybrid communication network in accordance with an embodiment.

In the specification, hybrid router 200 represents both hybrid router 200T and hybrid router 200R. Hybrid router 200 may dynamically control the number of sub-flows based on characteristics of satellite network 1600 in accordance with at least one embodiment. Hereinafter, hardware and software structure of hybrid router 200 will be described in more detail with reference to FIG. 2. FIG. 2 is a block diagram illustrating hardware and software structure of a hybrid router in accordance with one embodiment.

Referring to FIG. 2, hybrid router 200 may include processor circuit 210, memory 220, input/output port 230, and communication circuit 240 in accordance with one embodiment. Processor circuit 210 may include main processor 211 and sub-flow control processor 212. Communication circuit 240 may include satellite communication processor 241 and cellular communication processor 242.

Input/output port 230 may be a port for receiving signals and data from a user or other device, such as UE 100. For example, through input/output port 230, hybrid router 200 may receive traffic or data generated by UE 100 and transmit traffic from service server 400.

Memory 220 may store a variety of information, such as software programs for operation, data received from other entities, and data generated as result of operations. That is, memory 220 may store an operation system data, applications, and related data, received from other entities through a variety of communication media (e.g., communication networks). Memory 220 may include at least one of an internal memory and an external memory according to embodiments. For example, memory 150 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Communication circuit 240 may communicate with other entities including service server 400, hybrid communication managing server 900, or another hybrid router through hybrid communication network 300. For example, communication circuit 240 may transmit service information (or service network information) and circuit information to service server 400 or hybrid communication managing server 900. Herein, the service information (or service network information) may be information on a service or a service network that UE 100 subscribes to or registers to service server 400 for receiving a predetermined service, and circuit information may be information on satellite communication processor 241. Further, communication circuit 240 may receive service performance information and service requirements information from service server 400.

Communication circuit 240 may include at least one circuitry module (or at least one circuit) for communicating with other entities through hybrid communication network 300. Herein, the communication network may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiment, communication circuit 1300 may include at least one of a wireless communication circuit and a wired communication circuit. Herein, the wireless communication circuit and wired communication may be separately or integrally configured.

In accordance with one embodiment, communication circuit 240 may include satellite communication processor 241 for processing data of sub-flows assigned to satellite communication from processor circuit 210 and transmitting the processed sub-flows through satellite network 600.

For example, satellite communication processor 241 may preform i) data modulation and demodulation: converting digital data into analog signals that can be transmitted over a satellite link (sub-flows) and vice versa, ii) error correction: using error correction algorithm to detect and correct errors that occur during transmission, iii) Packet switching: dividing data into packets and route them to their destination, iv) QoS (quality of service) management: ensuring that data is transmitted with the required quality of service, such as latency, jitter, and packet loss, and v) Security: encrypting data to protect it from unauthorized access.

In accordance with one embodiment, communication circuit 240 may further include cellular communication processor 241 for processing data of sub-flows assigned to cellular network 700 from processing circuit 210 and transmitting the processed sub-flows through cellular network 700.

For example, cellular communication processor 242 may be a specialized processor that is designed to handle the high data rates and complex processing requirements of cellular networks and may perform at least one of i) data modulation and demodulation, ii) error correction, iii) packet switching, iv) QoS (quality of service) management, and v) security.

Processor circuit 210 may include main processor 211 and sub-flow controlling processor 212 in accordance with one embodiment. Main processor 211 may perform or control overall operation of hybrid router 200. For example, main processor 211 may be a central processing circuitry that controls constituent elements of hybrid router 200 for dynamically controlling the number of sub-flows in hybrid communication network 300.

Processor circuit 210 may also include sub-flow controlling processor 212 in accordance with one embodiment. Sub-flow controlling processor 212 may be designed to perform dedicated operations for dynamically controlling the number of sub-flows in satellite network 600 included in hybrid communication network 300 in cooperation with main processor 211.

That is, sub-flow controlling processor 212 may perform operations that will be described in later with reference to FIG. 3 to FIG. 8. For example, sub-flow controlling processor 212 may perform comparing service performance information with service requirements information, determining whether service performance is satisfied with service requirements based on the comparison, increasing, reducing, maintaining the number of sub-flows in satellite network 600 and cellular network 700 based on the determination result, generating MPTCP sessions based on the determined number of sub-flows by a path discovery process, a sub-flow establishment process, and a sub-flow management process, distributing multiple sub-flows through packet scheduling, transmitting the distributed traffics, packet reordering to reassemble the packets, so forth.

Using processor circuit 210 including main processor 211 and sub-flow controlling processor 212, hybrid router 200 may dynamically adjust the number of sub-flows to achieve the following objectives, taking into consideration the characteristics of hybrid communication network 300 including cellular network 700 and satellite network 600 in accordance with one embodiment.

Figure 3:
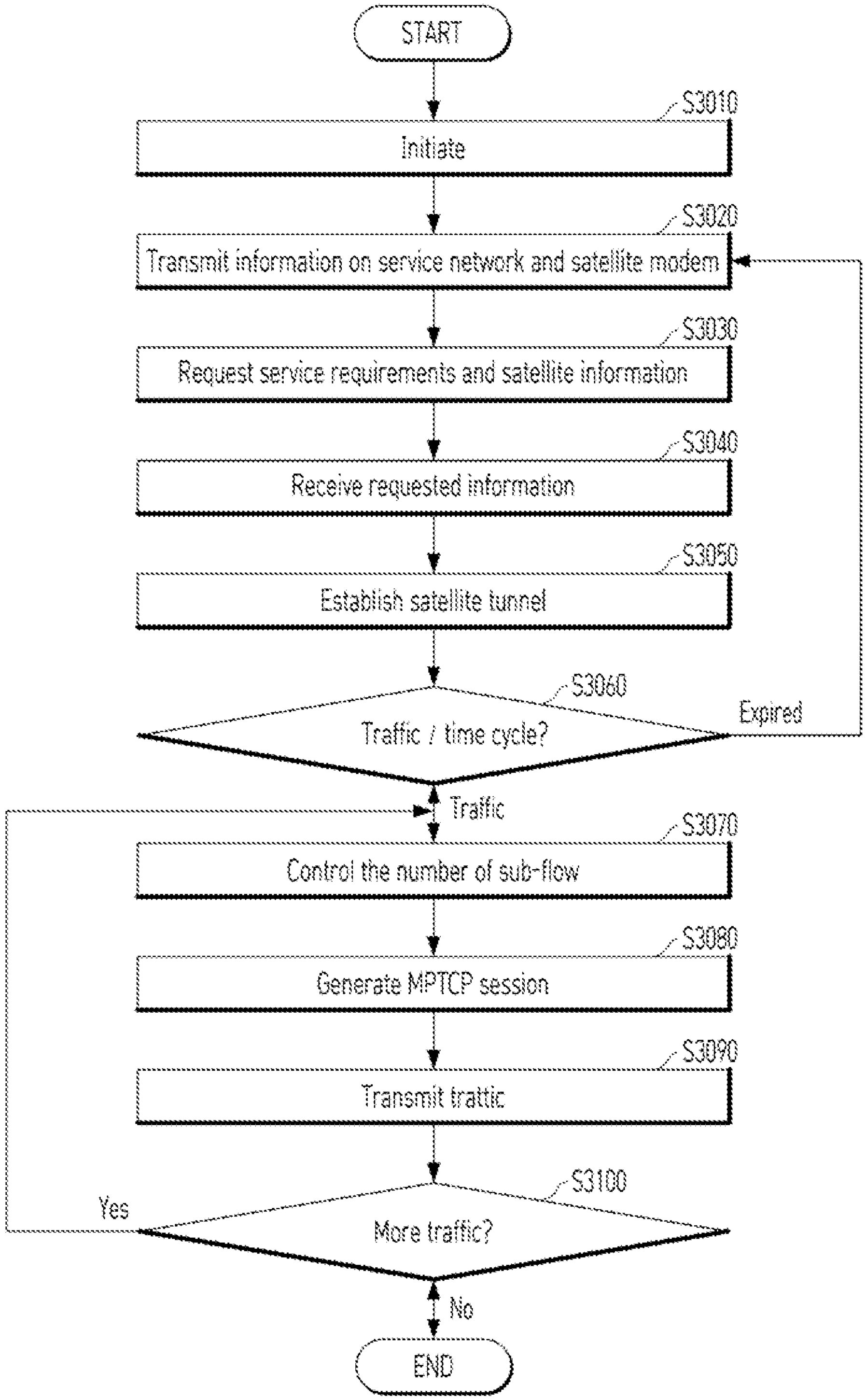
FIG. 3 is a flowchart illustrating a method for dynamically controlling the number of sub-flows in hybrid communication network in accordance with one embodiment.

Hereinafter, operations of hybrid router 200 will be described in more detail with reference to FIG. 3. For convenience of description and ease of understanding, hybrid router 200T is used for description of hybrid router 200. However, hybrid router 200R also performs operations similar to those described hereinafter. FIG. 3 is a flowchart illustrating a method for dynamically controlling the number of sub-flows in hybrid communication network in accordance with one embodiment.

Referring to FIG. 3, hybrid router 200T may be initiated at step S3010. In accordance with an embodiment, hybrid router 200T is powered on or initiated upon generation of predetermined events. The predetermined events may include any interruption triggering hybrid router 200 to be initiated. For example, such interruption may include receiving a predetermined signal from UE 100 or from service server 400 or receiving an input from a user to boot up or power up.

Upon the initiation, hybrid router 200T may access a predetermined computing server using a domain address that is predetermined and stored in memory 220. The predetermined computing server may be a server capable of collecting information on hybrid communication network 300 including satellite network 600 and cellular network 700, managing hybrid communication network 300 based on collected information, providing the collected information to others, collecting information necessary for communication with service server 400 and storing the collected information on a service provided to UE 100 by predetermined subscription or request. The predetermined computing server may be one of service server 400 or hybrid communication management server 900. Hereinafter, service server 400 will be described as including functions of hybrid communication managing server 900. However, the embodiments are not limited thereto. For example, service server 400 and hybrid communication managing server 900 are two independent computer servers each perform distinct functions in accordance with another embodiment.

At step S3020, information necessary for communication with service server 400 may be obtained and transmitted. In accordance with an embodiment, the information necessary for communication with service server 400 may include i) information on user equipment 100 and a service network that user equipment 100 belonging to or subscribes to receive a predetermined service from service server 400 and ii) information on a satellite communication processor 241 included in hybrid router 200T. Such obtained information may be transmitted to service server 400.

For example, hybrid router 200T may obtain the information necessary for communication with service server 400 and transmit the obtained information to service server 400 through hybrid communication network 300.

At step S3030, information on service requirements, satellite network, and current status of hybrid communication network may be requested. In accordance with one embodiment, hybrid router 200T may request i) information on service requirements for UE 100 to receive a related service, ii) information on satellite network 600, and iii) status of hybrid communication network 300 to at least one of service server 400.

At step S3040, the requested information on service requirements, satellite network, and status of hybrid communication network may be received. In accordance with an embodiment, hybrid router 200 may receive the requested service requirements and satellite information from at least one of service server 400 and hybrid communication management server 900.

In accordance with one embodiment, the service requirements include guaranteed network speed (e.g., network guaranteed throughput or network assured speed) and an allowed latency (e.g., acceptable latency or permissible delay) for supporting communication between service server 400 and UE 100 through hybrid communication network 300 including cellular network 700 and satellite network 600. As the guaranteed network speed, Mobile Edge Computing Service Bandwidth (MEC-SVC-BW: MSB) may be collected, and as the allowed latency, Mobile Edge Computing Service Round Trip Time (MEC-SVC-RTT: MSR) may be collected.

The guaranteed network speed or network assurance speed may be referred to as guaranteed network bandwidth. The guaranteed network speed represents the minimum network speed that the corresponding service network should provide and guarantee while delivering communication services. Therefore, if the actual network speed is lower than the guaranteed network speed (e.g., MSB), hybrid communication network 300 may fail to meet the service requirements.

The allowed latency may be referred to as assured delay that the corresponding service network should provide and guarantee while delivering communication services (e.g., predetermined services). Therefore, if the actual latency exceeds the guaranteed latency, hybrid communication network 300 may fail to meet the service requirements.

Further, the service requirements may include service mapping information which encompasses the identification ID, destination Internet Protocol (IP) address, and port addresses. Service mapping information may be used later to establish MPTCP sessions and control traffic transmission and reception.

Furthermore, a request for satellite information may be transmitted to satellite center 620 by transmitting information on satellite communication processor 241. Such a request may be transmitted by service sever 400. Upon the reception of the request, satellite center 620 may extract satellite information specific to satellite communication processor 241 (e.g., satellite modem) using the satellite communication processor information and transmit the extracted satellite information to service server 400. The satellite information may include the allocated uplink/downlink bandwidth information (e.g., SAT-MAX-BW: SMB) for the respective satellite modem 241. The allocated uplink/downlink bandwidth may be referred to as Satellite Maximum Bandwidth (SAT-MAX-BWP: SMB).

In addition, service performance information may include information on current status of cellular network 700 and satellite network 600 in hybrid communication network 300. For example, service performance information may include i) a current network speed (e.g., CUR-SVC-BW:CSB), which is actually measured in communication between service server 400 and UE 100 and ii) a current latency (e.g., CUR-SVC-RTT: CSR) which is actually measured in communication between service server 400 and UE 100.

At step S3050, a satellite tunnel may be established based on the received satellite information and the service requirements. In accordance with one embodiment, once the satellite information is received, hybrid router 200 may establish a satellite tunnel with hybrid router 200R connected to service server 400 by performing tunneling operation based on a predetermined tunneling protocol using the satellite information. Such a satellite tunnel is established to prevent packet tampering occurring in satellite network 600.

Due to high latency characteristics of satellite network 600, hybrid router 200 performs packet modification by default. When packet modification is performed, a TCP operations field for MPTCP-based communication is removed from the packets. As a result, MPTCP-related operations such as packet reordering becomes impossible. In order to avoid packet modification occurring in satellite network 600, one hybrid router (e.g., 200T) establishes satellite tunneling with another hybrid router (e.g., 200R) at the other end.

Such packet modification is not performed in cellular network 700. Accordingly, there is no need for tunneling in cellular network 700. Hybrid router 200T may route the created tunnel specifically for use in satellite network 600. As a result, hybrid router 200 may configure to set a tunnel only in satellite network 600 while excluding the cellular network 700.

At step S3060, determination may be made whether traffic is received or whether a predetermined time cycle is expired.

When the predetermined time cycle is expired at step S3060—Expired, information on the service provided to or the service network connected to UE 100 and the satellite communication processor 241 that is included in hybrid router 200 may be collected again and transmitted to service server 400 at step S3020.

For example, hybrid router 200 (200R, 200T) may periodically collect service performance information, including network speed and latency, in communication between service server 400 and UE 100 through hybrid communication network 300. Additionally, based on the service requirements that include guaranteed network speed and allowed latency, as well as the service performance information that includes actual network speed and latency, hybrid router 200 may dynamically adjust the number of sub-flows in satellite network 600 of hybrid communication network 300.

When hybrid router 200T receives the traffic at step S3060—Taffic, the number of sub-flow for satellite network may be controlled based on various factors at step S3070. In accordance with an embodiment, the controlling of the number of sub-flows may include increasing, reducing, or maintaining the number of sub-flows. For example, hybrid router 200T may collect information at regular intervals (e.g., a predetermined time cycle), such as service performance information, and regularly or dynamically control the number of sub-flows according to the collected information.

That is, in accordance with one embodiment, dynamically controlling the number of sub-flows may include: determining the number of sub-flows, generating sub-flows based on the determined number, maintaining the sub-flows, and cancelling, deleting, or removing the sub-flows. Such controlling operation may be performed based on information on the service requirements and the satellite information. For example, the service requirements include a guaranteed network speed and an allowed latency. As the guaranteed network speed, Mobile Edge Computing Service Bandwidth (MEC-SVC-BW: MSB) may be collected, and as the allowed latency, Mobile Edge Computing Service Round Trip Time (MEC-SVC-RTT: MSR) may be collected.

Furthermore, the following characteristics of the cellular network and the satellite network may be collected and used to control the number of sub-flows. For example, CUR-SVC-BW (CSB) is a network speed actually measured between a service server and a user equipment. It is a current network speed. CSB may be a network speed of an entire network including a cellular network and a satellite network including sub-flows of a cellular network and sub-flows of a satellite network. Accordingly, CSB may be used as a reference point denoting a communication service quality provided to a user equipment. That is, when CSB is lower than MSB, it means that the service requirements are not satisfied.

CSR (CUR-SVC-RTT) is a current delay time measured in communication between the service server and a user equipment. CSR may include latency of entire network including cellular network and satellite network including sub-flows. Accordingly, CSR may be also used as a reference point denoting a communication service quality provided to the user equipment. That is, when CSR is lower than MSR, service requirements are satisfied.

Based on the characteristics of the cellular network and the satellite network, the number of sub-flows may be controlled as follows.

First, using the resources of cellular network 700 primary and resources of satellite network 600 as secondary for compensating the defects of cellular network to satisfy entire network service requirements, consider the cost of satellite, which is very higher than that of a cellular network. That is, the number of sub-flows of the satellite network is dynamically controlled. For example, hybrid router 20 may fix the number of sub-flows of the cellular network and dynamically control the number of sub-flows of the satellite network according to the service performance information on the current network status.

Second, actual performance of a satellite network may be lower as compared to allocated resources to the satellite network. Accordingly, CSB may become lower when the number of sub-flows of the satellite network is too less. It is necessary to increase the number of sub-flows of the satellite network appropriately.

Third, when the number of sub-flows is too many, resources may be wasted because of increment in packet ordering, CSR might be increased between a service server and a user equipment. Accordingly, overall network performance may be deteriorated. Further, since the satellite network is comparatively high cost than the cellular network, it might be wasted when the resources of the satellite network are used more than necessary. Accordingly, it is necessary to appropriately lower the number of sub-flows of the satellite network.

Fourth, when controlling the number of sub-flows too frequently, TCP 3 way-handshake for generating a sub-flow may be performed too much, thereby lower the performance. Accordingly, it is necessary to control the number of sub-flows when it is necessary to.

As described, hybrid router 200T collects i) service requirements information and ii) service performance information and dynamically controls the number of sub-flows in hybrid communication network 300 based on the service requirements information and service performance information in accordance with one embodiment. Such operations will be described later with reference to FIG. 4 to FIG. 7.

At S3080, MPTCP sessions may be generated based on the controlled number of sub-flows for satellite network. For example, since hybrid communication network 300 supports multipath communication through satellite network 600 and cellular network 700, TCP sub-flows may be created in both cellular network 1700 and satellite network 600. Hereinafter, TCP sub-flows will be simply referred to as "sub-flows".

In addition, hybrid router 200 at the other end (e.g., hybrid router 200R) may perform equivalent to hybrid router 200T. For example, when traffic is received the service server 400, hybrid router 200R may establish an MPTCP session to hybrid router 200T.

Multi-path TCP (MPTCP) sessions may be generated through a path discovery process, a sub-flow establishment process, and a sub-flow management process. After the path discovery, parallel sub-flows may be established between service server 400 and UE 100, for example, not limited to, using the TCP three-way handshake for each path, in the sub-flow establishment. Before establishing such parallel sub-flows, hybrid router 200 may determine the number of sub-flows in satellite network 600 based on the service requirement information and the service performance information. During the sub-flow establishment process, hybrid router 200 may establish sub-flows associated with satellite network 600 and cellular network 700 based on the determined number of sub-flows in accordance with one embodiment.

Further, after the sub-flow establishment operation, hybrid router 200 may regularly collect the service requirements information and the service performance information and dynamically control the sub-flows in satellite network 600 in accordance with one embodiment.

At step S3090, traffic may be transmitted through the generated MPTCP sessions. In accordance with one embodiment, once the MPTCP session is established, UE 100 may be able to communicate with service server 400 and exchange traffic. For example, traffic transmitted by UE 100 is distributed to multiple sub-flows created in hybrid router 200T through packet scheduling, then the distributed traffics are transmitted through hybrid communication network 300 including satellite network 600 and cellular network 700. Hybrid router 200R at the other end (e.g., service server 400) performs packet reordering to reassemble the packets before sending them to service server 400. Similarly, traffic sent by service server 400 is distributed to multiple sub-flows created in hybrid router 200R through packet scheduling and transmitted to UE 100 through hybrid communication network 300 including satellite network 600 and cellular network 700. Hybrid router 200T at the other end (e.g., UE 100) performs packet reordering to reassemble the packets before sending them to UE 100.

At step S3100, hybrid router 200 may determine whether more traffic is received or not. When no more traffic is received at step S3100—No, the operations of hybrid router 200 ends or pauses. When more traffic is received at step S3100—Data, hybrid router 200 may dynamically control the number of sub-flows in satellite network 600 based on the received information again at step S3070.

As described, hybrid router 200 dynamically controls or adjusts the number of sub-flows according to status of hybrid communication network 300 at step S3070 in accordance with an embodiment. Hereinafter, such operation at step S3070 will be described in more detail with the accompanying drawings.

Figure 4:
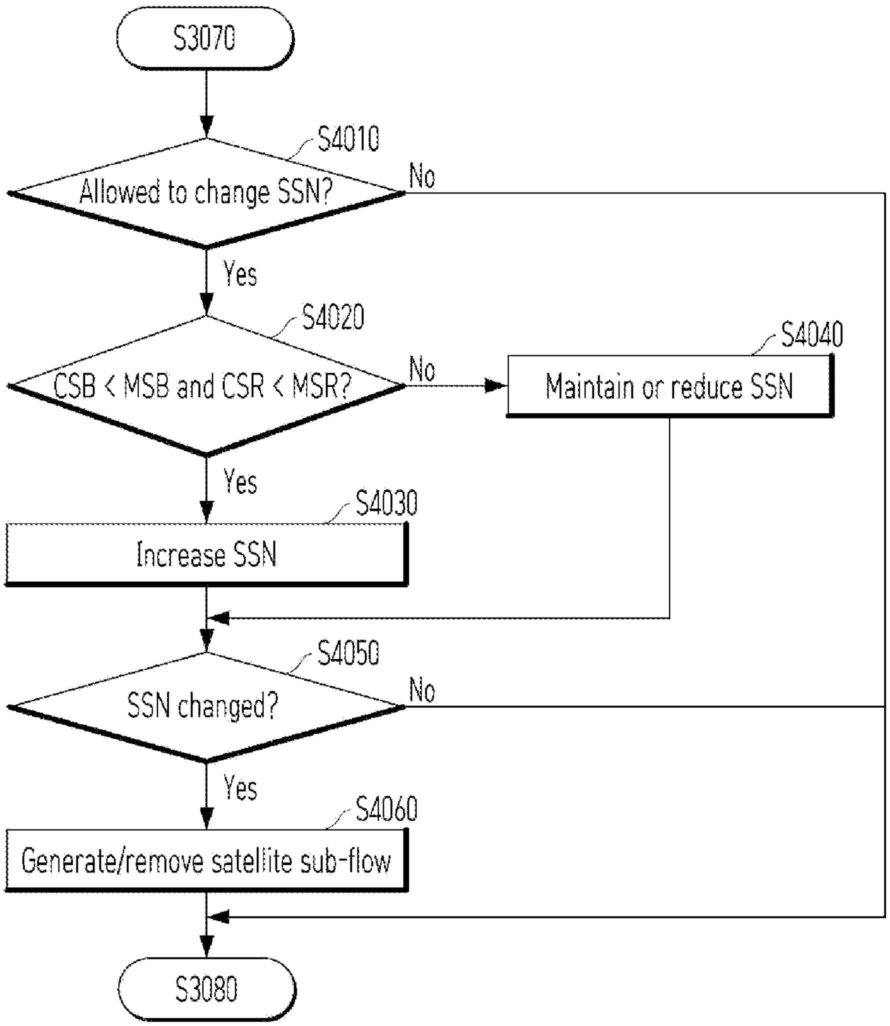
FIG. 4 is a flowchart illustrating operations for controlling the number of sub-flows in accordance with at least one embodiment.

FIG. 4 is a flowchart illustrating operations for controlling the number of sub-flows in accordance with at least one embodiment. Referring to FIG. 4, hybrid router 200 may determine whether a change of the number of sub-flows is possible at step S4010. The number of satellite sub-flows may refer to Satellite Sub-flow Numbers (SAT_SUBFLOW_NUM: SSN). Hybrid router 200 may use service performance information of a current cycle and that of a previous cycle to determine whether the change is possible or not. Such an operation is illustrated in FIG. 5.

Figure 5:
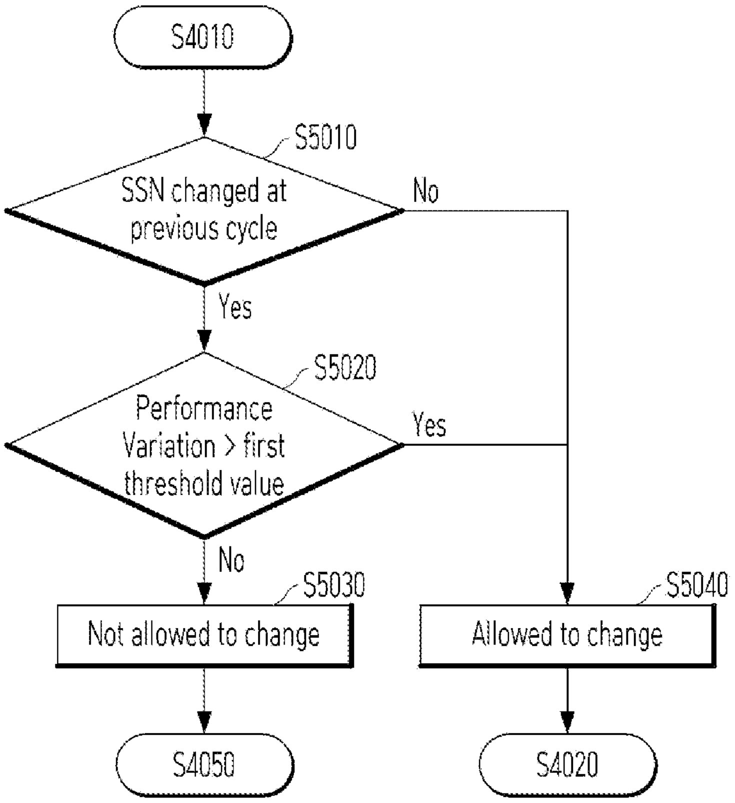
FIG. 5 illustrates a method for determining whether change of the number of sub-flows in satellite network (e.g., SSN) is possible in accordance with an embodiment.

FIG. 5 illustrates a method for determining whether change of the number of sub-flows in satellite network (e.g., SSN) is possible in accordance with an embodiment. Referring to FIG. 5, determination may be made whether the satellite sub-flows number is changed at a previous period at step S5010. For example, hybrid router 200 may determine whether the satellite sub-flows number (SSN) is changed at a previous cycle.

If SSN is not changed at the previous period at S5010-NO, hybrid router 200 determines that it is allowed to change SSN at a current cycle at step S5040.

On the other hand, if SSN is changed at the previous cycle at step S5010—YES, hybrid router 200 may determine that it is possible to change SSN if predetermined conditions are satisfied. For example, to prevent frequent changes in the number of sub-flows, hybrid router 200 may determine whether a performance variation amount between the service performance of the previous cycle and the current cycle exceeds a first threshold value or not at step S5020. If the performance variation amount exceeds or equals the first threshold value at step S5020—YES, hybrid router 200 may decide to change the number of sub-flows in satellite network 600 as it is deemed changeable at step S5040.

The performance variation refers to variation in at least one of the network speed (CSB) or the latency (CSR) between the previous cycle and the current cycle. Specifically, the performance variation may be represented by value that reflects both variation in the network speed (CSB) between the previous cycle to the current cycle. The performance variation may be expressed using the following equation.

$$performance variation = \omega\frac{|TP_{cur} - TP_{old}|}{TP_{old}} + (1-\omega)\frac{|RTT_{cur} - RTT_{old}|}{RTT_{old}}, \quad 0 < \omega < 1 \qquad \text{Eq. 1}$$

In Eq. 1, $TP_{cur}$ denotes a network speed of a current cycle, $TP_{old}$ is a network speed of a previous cycle, $RTT_{cur}$ denotes a latency of a current cycle, and $RTT_{old}$ is a latency of a previous cycle. ω is a weight.

That is, the performance variation may be defined as the ratio of the difference between the current cycle's service performance and the previous cycle's service performance.

Hybrid router 200 may determine that the number of sub-flows is changeable if there has been a change in the number of sub-flows in the previous cycle and the performance variation exceeds the first threshold. Therefore, as the performance variation increases, the likelihood of the number of sub-flows being changed also increased.

For example, the assumption is made that the number of sub-flows increased in the previous cycle. Now, the decision needs to be made whether to change the number of sub-flows again in the current cycle. If the performance variation exceeds the first threshold, it means that increasing the number of sub-flows in the previous cycle has resulted in a significant improvement in the current performance. This indicates that there is a high possibility of further performance improvement if the number of sub-flows is further increased.

On the other hand, if in the previous cycle, the number of sub-flows was increased but there was little to no change in performance, it means that even if the number of sub-flows is increased again, there is a low possibility of significant performance improvement. An example of this is when most of the allocated resources from the satellite network 600 are already being utilized, and increasing the number of sub-flows does not result in performance improvement. In such cases, increasing the number of sub-flows can lead to frequent changes, which can cause issues such as increased packet reordering, increased latency, and ultimately a decrease in network performance.

Therefore, hybrid router 200 may determine that the number of sub-flows in satellite network 600 is changeable if the performance variation exceeds the first threshold value (or is equal to it) at step S5040. Conversely, if the performance variation is below the first threshold (or is less than or equal to it), hybrid router 200 may decide that the number of sub-flows in satellite network 600 is not allowed to be changed at step S5030.

If it is determined that the number of sub-flows is unchangeable at step S4010-NO, hybrid router 200 may terminate the process of adjusting the number of sub-flows in the current cycle and generates MPTPC session based on the number of sub-flows determined in the previous cycle at step S3080.

On the other hand, if it is determined that the number of sub-flows is changeable at step S4010—YES, hybrid router 200 may assess whether the network speed (CSB) satisfies the guaranteed network speed (MSB) and whether the delay time (CSR) meets the allowed latency time (MSR) at step S4020.

If the network speed is lower than the guaranteed network speed (CSB<MSB) and the delay time is smaller than the guaranteed delay time (CSR<MSR) at step S4020—YES, it indicates that the network speed does not meet the guaranteed network speed and the delay time meets the guaranteed delay time. Accordingly, hybrid router 200 may decide to increase the number of sub-flows in satellite network at step S4030.

If it is decided to increase the number of sub-flows in satellite network, hybrid router may determine the number of sub-flows (SSN) at step 4030. Hereinafter, the method of determining the number of sub-flows (SSN) will be described with reference to FIG. 6.

Figure 6:
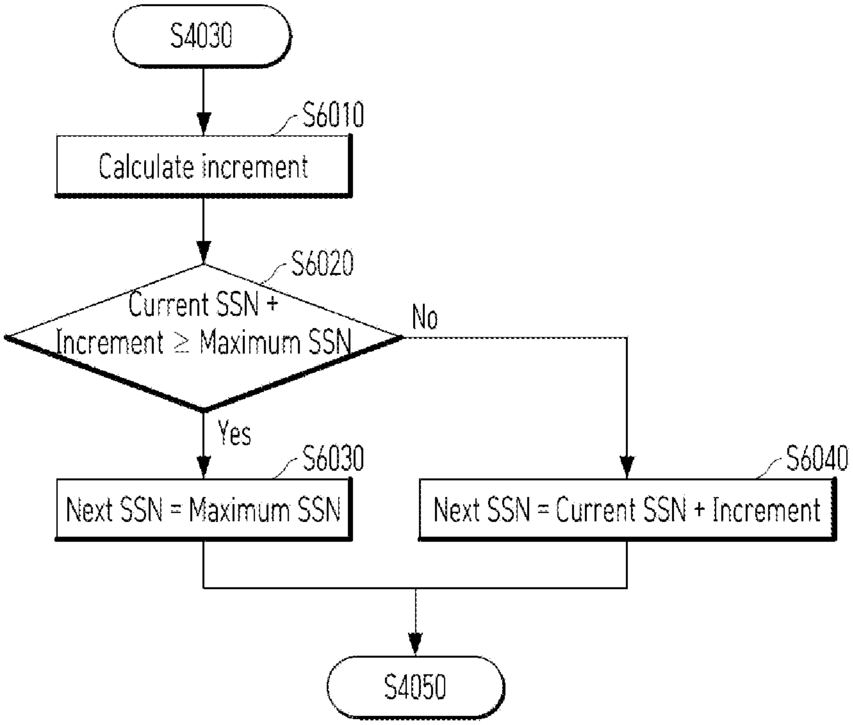
FIG. 6 is a flowchart illustrating operations of hybrid router for increasing the number of sub-flows in satellite network.

FIG. 6 is a flowchart illustrating operations of hybrid router for increasing the number of sub-flows in satellite network. Referring to FIG. 6, at step S6010, hybrid router 200 may determine an increment value of sub-flows in satellite network 600 using a network speed (CSB) and a latency (CSR). The increment value of the number of sub-flows in satellite network 600 may be expressed using the following equation.

$$\text{Incremental value} = \text{int}(\omega_1\frac{MSB}{CSB} + \omega_2\frac{MSB}{CSB} + \omega_2 \cdot \text{cellular network occupancy}, \quad \text{where } \omega_1 + \omega_2 + \omega_3 = 1 \qquad \text{Eq. 2}$$

In Eq. 2, MSB is a guaranteed network speed, CSB is a network speed, MSR is an allowed latency, and CSR is a current latency. 'int' denotes an integer. The increment value may be output as an integer by truncating the decimal portion by 'int'.

Referring to Eq. 2, the network speed (CSB) is used to calculate the increment value. More specifically, the ratio of network speed (CSB) to the network guarantee speed (MSB) is used to determine the increment value.

Therefore, as the network speed (CSB) decreases, a higher increment value can be calculated. Specifically, since the network guarantee speed (MSB) is fixed value, the increment value when the network speed (CSB) is the first value (smaller than the second value) can be greater than the increment value when the network speed (CSB) is the second value.

In other words, currently the network speed (CSB) does not meet the network guarantee speed (MSB), and the lower the network speed (CSB) is, the less it satisfies the network guarantee speed (MSB). Therefore, as the network speed (CSB) decreases, in order to increase the network speed by increasing the number of sub flows, the increment value can be larger.

Referring back to Eq. 2, the latency (CSR) is used to calculate the increment value. More specifically, the ratio of the latency (CSR) to the guaranteed delay time (MSR) is used to calculate the increment value.

Therefore, as the latency (CSR) decreases, a higher increment value can be calculated. Specially, since the allowed latency (MSR) is a fixed value, the increment value when the latency (CSR) is the first value (Smaller than the sconed value) can be greater than the increment value when the delay time (CSR) is the second value.

Currently, the network speed (CSB) does not meet the network guarantee speed (MSB), but the latency (CSR) meets the allowed latency (MSR). Furthermore, as the latency (CSR) decreases, it more effectively satisfies the allowed latency (MSR). Thus, even when increasing the network speed (CSB), if the latency (CSR) remains low, there is a higher likelihood of continuously meeting the guaranteed delay time (MSR). Therefore, as the delay time (CSR) decreases, hybrid router 200 may increase the number of sub-flows more significantly.

Additionally, hybrid router 200 may determine the increment value of the number of sub-flows in satellite network 600 by utilizing not only the network speed (CSB) and latency (CSR) but also the occupancy of cellular network 700 in communication between service server 400 and UE 100 according to Eq. 2.

The occupancy of cellular network refers to the extent to which the cellular network 700 contributes to the current network speed (CSB) in communication between service server 400 and UE 100. The occupancy of the cellular network may be represented by the following equation.

$$\text{occupancy of cellular network} = \frac{TP_{cell}}{TP_{cell} + \text{AVG\_TP}_{sat\_sub}} \quad \text{Eq. 3}$$

In Eq. 3, $\text{TP}_{cell}$ denotes a current network speed of a cellular network, and $\text{AVG\_TP}_{sat\_sub}$ is an average value of current network speeds of at least one sub-flows in satellite network.

In other words, the occupancy of cellular network 700 may be defined as the ratio of the sum of the average speed (AVG_TPsat_sub) of one or more sub-flows in satellite network and the current network speed (TPcell) of the cellular network to the current network speed (TPcell) of the cellular network itself.

For example, if the occupancy of a cellular network (e.g., the result of Eq. 3) is 0.5, it means that the cellular network is responsible for half of the network speed (CSB). Furthermore, as the occupancy of the cellular network approaches 1, it indicates that the cellular network is responsible for the majority of the network speed (CSB), implying that the satellite resources are being underutilized.

Indeed, currently the network speed (CSB) is not meeting the network guarantee speed (MSB), so it is necessary to increase the network speed (CSB). Therefore, as the occupancy of the cellular network increases, a higher increment value can be calculated. Specifically, when the occupancy of the cellular network is greater than the first value (greater than the second value), the first increment value can be greater than the second increment value when the occupancy of the cellular network is the second value.

On the other hand, as the occupancy of the cellular network decreases, a lower increment value can be calculated in accordance with an embodiment. For example, when the occupancy of the cellular network is close to 0, it means that despite maximizing the utilization of satellite resources, the network speed (CSB) is not meeting the network guarantee speed (MSB). In such cases, even if the number of sub-flows in the satellite network is increased, it may be difficult to improve the network speed (CSB), and instead, it could lead to a decrease in performance due to the increased number of sub-flows. Therefore, as the occupancy of the cellular network decreases, a lower increment value may be calculated in accordance with an embodiment.

Referring back to Eq. 2, hybrid router 200 may calculate the increment value by applying weights to the network speed (CSB), delay (CSR), and the occupancy of the cellular network in accordance with an embodiment. These weights may be determined by considering factors such as communication quality or cost.

On the other hand, the number of sub-flows in satellite network 600 may be adjusted within a range of minimum (e.g., 1) and maximum (e.g., 5) values in accordance with another embodiment.

Once the increment value is calculated at step S6010, hybrid router 200 may determine whether the sum of the current number of sub-flows in satellite network 600 (e.g., current SSN) and the increment value exceeds the maximum number of sub-flows (e.g., maximum SSN) at step S6020.

If the sum of the current number of sub-flows in satellite network 600 (e.g., current SSN) and the increment value exceeds or equals the maximum number of sub-flows (e.g., maximum SSN) at step S6020—YES, hybrid router 200 may set the number of sub-flows in satellite network 600 (e.g., next SSN) as the maximum number of sub-flows (e.g., maximum SSN) at step S6030.

On the other hand, if the sum of the current number of sub-flows in satellite network 600 (e.g., current SSN) and the increment value is less than the maximum number of sub-flows (e.g., maximum SSN) at step S6020—NO, hybrid router 200 may set the number of the sub-flows in satellite network 600 (e.g., next SSN) as the sum of the current number of sub-flows (e.g., current SSN) and the increment value at step S6040.

Referring back to FIG. 4, if the network speed (CSB) is higher than the network guarantee speed (MSB) (e.g., satisfying the network guarantee speed (MSB)) and if the delay time (CSR) is greater than the guaranteed delay time (MSR) at step S4020—NO, hybrid router 200 may decide to maintain or decrease the number of sub-flows in satellite network at step S4040.

Figure 7:
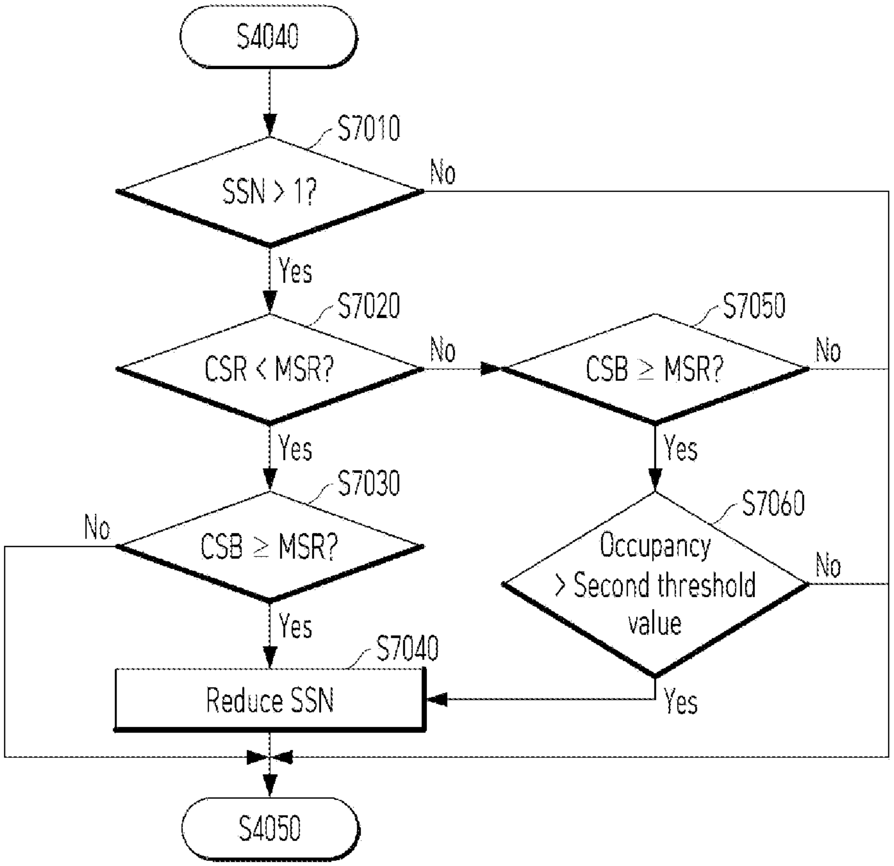
FIG. 7 is a flowchart illustrating a method for maintaining or decreasing the number of sub-flows in satellite network in accordance with one embodiment.

Hereinafter, such an operation for maintaining or decreasing the number of sub-flows in satellite network 600 will be described with reference to FIG. 7. FIG. 7 is a flowchart illustrating a method for maintaining or decreasing the number of sub-flows in satellite network in accordance with one embodiment.

Referring to FIG. 7, hybrid router 200 may check if the current number of sub-flows in satellite network 600 (SSN) is greater than the minimum number (e.g., 1) at step S7010. If it (e.g., current SSN) is equal to the minimum number (e.g., current SSN=1), the operation S4050 may be performed.

If the current number of sub-flows in satellite network 600 (SSN) is greater than the minimum number (e.g., 1) at step S7010—YES, hybrid router 200 may determine whether the current latency (CSR) is smaller than (e.g., satisfies) the allowed latency (MSR) at step S7020.

If the current latency (CSR) is not smaller than (e.g., does not satisfy) the allowed latency (MSR) (e.g., CSR>MSR) at step S7020—NO, hybrid router 200 may assess whether the current network speed (CSB) meets the guaranteed network speed (MSB) (CSB> or =MSB) at step S7050.

If the current latency (CSR) does not satisfy the allowed latency (MSR) at step S7020—YES, and if the current network speed (CSB) meets the guaranteed network speed (MSB) at step S7030—YES, hybrid router 200 may decide to reduce the number of sub-flows in satellite network 600 at step S7040.

In particular, if the current latency (CSR) does not meet the allowed latency (MSR), it indicates the need to decrease the number of sub-flows in satellite network 600 to reduce the current latency (CSR). Moreover, if the current network speed (CSB) meets the guaranteed network speed (MSB), it means that there is potential to decrease the number of sub-flows in satellite network 600 despite the decrease in the current network speed (CSB). In cases where reducing the number of sub-flows significantly impacts the current network speed (CSB), it is possible to readjust the number of sub-flows in the next cycle. Therefore, when the current latency (CSR) does not satisfy the allowed latency (MSR)

and the current network speed (CSB) meets the guaranteed network speed (MSB), hybrid router 200 may decide to reduce the number of sub-flows in satellite network 600 at step S7040.

If the current latency (CSR) satisfies the allowed latency (MSR) at step S7020—YES, hybrid router 200 may determine whether the current network speed (CSB) meets the guaranteed network speed (MSB) at step S7050. If the current latency (CSR) satisfies the allowed latency (MSR) at step S7020—YES, but the current network speed (CSB) does not meet the guaranteed network speed (MSB) at step S7030—NO, hybrid router 200 may decide not to reduce the number of sub-flows in satellite network 600 and perform the operation S4050.

When the current network speed (CSB) does not meet the guaranteed network speed (MSB) (e.g., CSB is slower than MSB, decreasing the number of sub-flows in satellite network 600 may further deteriorate the current network speed (CSB). Therefore, even though there is a possibility to decrease the number of sub-flows due to the satisfaction of the current latency time (CSR) meeting the allowed latency (MSR), if the current network speed (CSB) fails to meet the guaranteed network speed (MSB), hybrid router 200 may decide not to decrease the number of sub-flows in accordance with one embodiment.

In addition, when the current latency (CSR) does not meet the allowed latency (MSR) at step S7020—NO and the current network speed (CSB) satisfies the guaranteed network speed (MSB) at step S7030—YES, hybrid router 200 may determine whether to decrease the number of sub-flows in satellite network 600 using the occupancy of the cellular network in communication between service server 400 and UE 100 at step S7060. In particular, if the occupancy of the cellular network is greater than the second threshold value at step S7060—YES, hybrid router 200 may decide to decrease the number of sub-flows in satellite network 600 at step S7040.

It is an optimal state in terms of performance if the current latency (CSR) meets the allowed latency (MSR) and the current network speed (CSB) satisfies the guaranteed network speed (MSB). However, reducing the usage of satellite network 600 and utilizing more resources from cellular network 700 may be advantageous in terms of cost. Therefore, hybrid router 200 may use the occupancy of the cellular network to determine whether to decrease the number of sub-flows in satellite network 600.

Referring back to Eq. 3, the cellular network occupancy may be represented by the ratio of the sum of 'the average speed of one or more sub-flows of the satellite (AVG_TP-sat_sub)' and 'the current network speed of the cellular network (TPcell)' to the current network speed of the cellular network (TPcell).

Therefore, a high cellular network occupancy implies that a larger portion of the network speed (CSB) is being handled by cellular network 700. This indicates that the current state satisfies the network guarantee speed (MSB) even with fewer resources being utilized from satellite network 600. Thus, if the cellular network occupancy exceeds the second threshold, hybrid router 200 may attempt to decrease the number of sub-flows to further utilize the resources of cellular network 700. In cases where reducing the number of sub-flows negatively affects performance, it is possible to readjust the number of sub-flows in the next cycle.

Conversely, a low cellular network occupancy indicates that a larger portion of the network speed (CSB) is being handled by satellite network 600. This implies that the current state requires more utilization of satellite network resources in order to achieve the guaranteed network speed (MSB). In such a state, reducing the number of sub-flows may result in a significant degradation of the current network speed (CSB). Therefore, if the cellular network occupancy is below the second threshold, hybrid router 200 may decide not to decrease the number of sub-flows in satellite network 600.

On the other hand, hybrid router 200 may gradually decrease the number of sub-flows in satellite network 600 by one at a time. Referring back to FIG. 4, if it is determined that the number of sub-flows remains unchanged and maintained at step S4050-NO, hybrid router 200 may not adjust the number of sub-flows in the current cycle.

However, if it is determined that the number of sub-flows should be changed at step S4050—YES, hybrid router 200 may create or remove sub-flows based on the determined number of the sub-flows in satellite network 600 at 54060. After the sub-flows are created or removed, hybrid router 200 may perform the operation S3080 to collect the current network speed (CSB) and current latency (CSR) in the next cycle.

Figure 8:
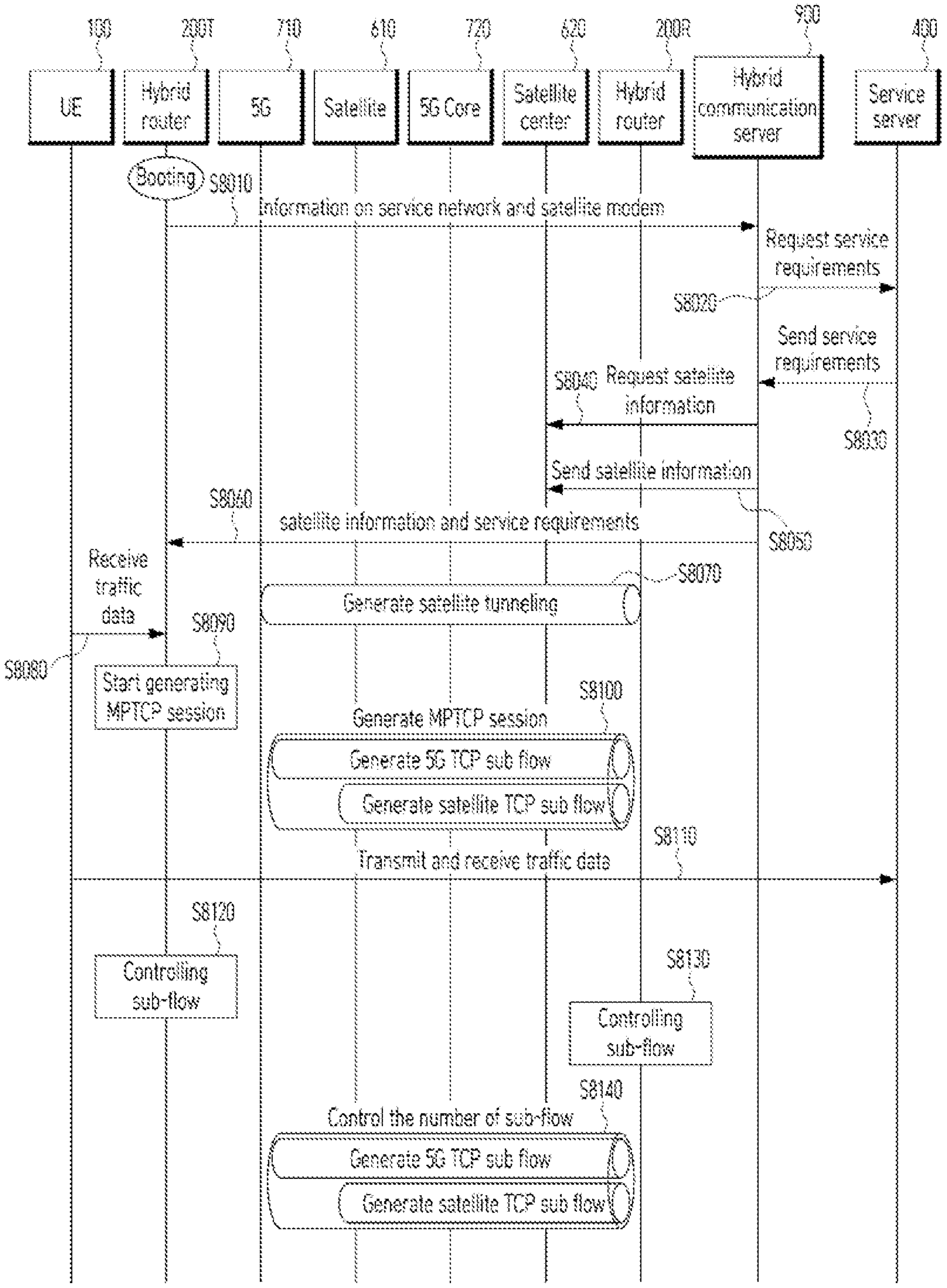
FIG. 8 is a diagram illustrating a method for optimizing hybrid communication by controlling sub-flows in a hybrid communication network in accordance with another embodiment.

Hereinafter, operations of hybrid router 200 according to another embodiment will be described with reference to FIG. 8. FIG. 8 is a diagram illustrating a method for optimizing hybrid communication by controlling sub-flows in a hybrid communication network in accordance with another embodiment.

Referring to FIG. 8, hybrid router 200 may be initiated and access to hybrid communication managing server 900 using a predetermined domain address and transmit service network information (e.g. information on a service that UE subscribes or a service network that UE belongs to) and satellite communication processor information to hybrid communication managing server 900 at step S8010. At step S8020, hybrid communication managing server 900 may transmit the service network information to service server 400 and request service requirement information to service server 400.

At step 8030, service server 400 may extract service requirements applied to the service network where UE 100 belonging to using the service network information and transmit the service requirements to hybrid communication managing server 900. Service requirements may include guaranteed network speed (MEC-SVC-BW: MSB) or allowed latency (MEC-SVC-RTT, MSR). The service requirements may further include service mapping information including ID, destination IP address, a port address. Such service mapping information may be used to establish a MPTCP (Multipath Transmission Control Protocol) session and transmitting/receiving traffic data.

At step 8040, hybrid communication managing server 900 may transmit satellite communication processor information of hybrid router 200 to satellite center 620 and requires satellite information allocated to hybrid router 200. At step 850, satellite center 620 may extract satellite information applied to satellite communication processor 241 using the satellite modem information and transmit the extracted satellite information to hybrid communication managing server 900. The satellite information may include SAT-MAX-BW allocated to the satellite modem.

At step S8060, hybrid communication managing server 900 may transmit satellite information, service requirements to hybrid gateway 200R and hybrid router 200T. At step S8070, hybrid router 200T may establish a satellite tunnelling with hybrid gateway 200R in order to prevent packet tempering (or packet manipulation) in satellite network 600.

Because satellite network 600 has a comparatively high (long) round trip time (RTT), hybrid router 200 typically performs a packet manipulation (modification). In case of packet manipulation, a TCP option field may be removed from a packet. The TCP option field is necessary for communication based on MPTCP. In this case, it is impossible to perform MPTCP related operations such as packet reordering. Therefore, in order to avoid packet manipulation occurring in a satellite network, Hybrid router 200T may establish a satellite tunnelling.

Unlike satellite network 600, a packet modification (e.g., packet manipulation) is not performed in cellular network 700, it is not necessary to establish a tunnelling in a cellular network. Therefore, hybrid router 200 may perform a routing operation to use a tunneling only to the satellite network. Accordingly, between a cellular network and a satellite network, tunnelling is only used for the satellite network.

At step S8080, hybrid router 200T may receive traffic from UE 100. At step S890, hybrid router 200T may generate a MPTCP session to hybrid gateway or service server.

As described, hybrid communication network 300 may use multiple networks and supports multi path communication through a satellite network and a cellular network. That is, hybrid router 100 may generate a TCP sub-flow of a cellular network and a TCP sub-flow of a satellite network. Hereinafter, TCP sub-flow will be referred to as a sub-flow.

Hybrid router 200R (e.g., hybrid gate) also performs operation corresponding to related operation of hybrid router 200T. For example, when service server 400 generates traffic, hybrid router 200R (or hybrid gateway) may generate a MPTCP session to the hybrid router 200T. At step S8100, upon the generation of the MPTCP session, UE 100 may be able to communicate with the service server by transmitting and receiving traffic at step S8110.

In accordance with one embodiment, hybrid router 200T receives traffic generated by UE 100 in a corresponding service network, distributes the received traffic by packet scheduling through a plurality of sub-flows which are generated for hybrid communication network 300 including satellite network 600 and cellular network 700 and transmits the distributed traffic through a plurality of sub-flows to service server 400.

Hybrid router 200R (e.g., hybrid gateway) may receive distributed traffics, assemble the distributed traffics through packet reordering, and transmit the reordered packet to service server 400.

Service server 400 generates and transmits traffic to hybrid router 200R. Hybrid router 200R distributes the traffic by packet scheduling through a plurality of sub-flows and transmits the distributed data traffic through a plurality of sub-flows to hybrid router or UE.

In accordance with at least one embodiment, hybrid router 200 (200T and 200R) may regularly collect service performance information including network speed and latency in communication between service server 400 and UE 200. Based on the collected information, hybrid router 200 may dynamically control the number of sub-flows of satellite network and cellular network at step S8120 and S8130. After controlling, traffic is transmitted and received at hybrid router 200T and hybrid router 200R using the controlled number of sub-flows in satellite network 600 in accordance with one embodiment.

As described, hybrid communication utilizing a multi-network consisting of a satellite network and a cellular network, the performance of the merged satellite and cellular networks is optimized by reflecting the characteristics of the satellite network in accordance with embodiments. According to the embodiments, performance and stability are secured and enhanced while efficiently utilizing resources and costs.

Transportation vehicles such as airplanes and ships, due to the nature of not being able to cover all routes with cellular networks alone, often rely on a combination of cellular and satellite networks. According to the embodiments, even in situations where the performance guarantee by the cellular network is not consistent, such as when a transportation vehicle enters and exits the coverage of the cellular network, flexible utilization of resources from both networks allows for the optimization of the merged performance of the satellite and cellular networks.

Reference herein to “one embodiment” or “an embodiment” means that a particular feature, structure, or characteristic described in connection with the embodiment can be included in at least one embodiment of the invention. The appearances of the phrase “in one embodiment” in various places in the specification are not necessarily all referring to the same embodiment, nor are separate or alternative embodiments necessarily mutually exclusive of other embodiments. The same applies to the term “implementation.”

As used in this application, the word “exemplary” is used herein to mean serving as an example, instance, or illustration. Any aspect or design described herein as “exemplary” is not necessarily to be construed as preferred or advantageous over other aspects or designs. Rather, use of the word exemplary is intended to present concepts in a concrete fashion.

Additionally, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

Moreover, the terms “system,” “component,” “module,” “interface,”, “model” or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present disclosure can be embodied in the form of methods and apparatuses for practicing those methods. The present disclosure can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present disclosure can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present disclosure can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for optimizing hybrid communication using a plurality of heterogeneous networks, the method comprising:

receiving service requirement information for supporting communication between a service server and a user equipment (UE) through a hybrid communication network including a satellite network and a cellular network, where the service requirement information is information on service requirements related to the service server and the service requirement information includes a guaranteed network speed and an allowed latency; and controlling a number of sub-flows of the hybrid communication network based on the service requirement information and service performance information, where the service performance information includes a current network speed and a current latency in communication between the service server and the UE, wherein the controlling the number of sub-flows comprises increasing the number of sub-flows in the satellite network based on an increment value determined using the current network speed and the current latency, in response to the current network speed being lower than the guaranteed network speed and the current latency being shorter than or equal to the allowed latency.

2. The method of claim 1, wherein the controlling a number of sub-flows comprises:

controlling a number of sub-flows in a satellite network included in the hybrid communication network.

3. The method of claim 2, wherein the controlling a number of sub-flows in a satellite network comprises:

determining whether to change the number of sub-flows in the satellite network using service performance information collected in a previous cycle and service performance information collected in a current cycle.

4. The method of claim 3, wherein the determining whether to change the number of sub-flows comprises:

determining to change the number of sub-flows in the satellite network in an event that the number of sub-flows in the satellite network was not changed in the previous cycle.

5. The method of claim 3, wherein the determining whether to change the number of sub-flows comprises:

determining to change the number of sub-flows in the satellite network in an event that performance variation between the service performance information collected in the previous cycle and the service performance information collected in the current cycle is greater than a predetermined threshold value.

6. The method of claim 1, wherein the increment value is determined to be higher as the current network speed decreases and as the current latency decreases.

7. The method of claim 1, wherein the determining an increment value comprises:

using an occupancy rate of the cellular network in communication between the service server and the UE with the current network speed and the current latency.

8. The method of claim 7, wherein the increment value is determined to be higher as the occupancy rate of the cellular network increases.

9. The method of claim 2, wherein the controlling a number of sub-flows in a satellite network comprises:

determining to decrease the number of sub-flows in the satellite network in an event that the current latency is slower than the allowed latency, and the current network speed is faster than the guaranteed network speed.

10. The method of claim 2, wherein the controlling a number of sub-flows in a satellite network comprises:

determining not to decrease the number of sub-flows in the satellite network in an event that the current latency is shorter than the allowed latency and the current network speed is slower than the guaranteed network speed.

11. The method of claim 2, wherein the controlling a number of sub-flows in a satellite network comprises:

determining whether to decrease the number of sub-flows in the satellite network using the occupancy rate of the cellular network in communication between the service server and the UE in an even that the current latency is shorter than the guaranteed latency and the current network speed is faster than the guaranteed network speed.

12. The method of claim 11, wherein the determining whether to decrease the number of sub-flows in the satellite network using the occupancy rate of the cellular network comprises:

determining to decrease the number of sub-flows in the satellite network in an event that the occupancy rate of the cellular network is greater than a predetermined threshold value.

13. An apparatus for optimizing communication in a hybrid communication network including heterogenous networks, the apparatus comprising:

an input port configured to receive inputs from an external device;

a memory configured to store data and information;

a main processor configured to control overall operations;

a communication circuit including a satellite communication processor and a cellular communication processor, configured to obtain service requirement information for supporting communication between a service server and a user equipment (UE) through a hybrid communication network including a satellite network and a cellular network, where the service requirement information is information on service requirements related to the service server and the service requirement information includes a guaranteed network speed and an allowed latency; and a sub-flow control processor configured to control a number of sub-flows of the hybrid communication network based on the service requirement information and service performance information, where the service performance information includes a current network speed and a current latency in communication between the service server and the UE, wherein the sub-flow control processor is configured to increase the number of sub-flows in the satellite network based on an increment value determined using the current network speed and the current latency, in response to the current network speed being lower than the guaranteed network speed and the current latency being shorter than or equal to the allowed latency.

14. The apparatus of claim 13, wherein the sub-flow control processor is configured to:

control a number of sub-flows in a satellite network included in the hybrid communication network.

15. The apparatus of claim 14, wherein the sub-flow control processor is configured to:

determine whether to change the number of sub-flows in the satellite network using service performance information collected in a previous cycle and service performance information collected in a current cycle.

16. The apparatus of claim 15, wherein the sub-flow control processor is configured to:

determine to change the number of sub-flows in the satellite network in an event that the number of sub-flows in the satellite network was not changed in the previous cycle.

17. The apparatus of claim 15, wherein the sub-flow control processor is configured to:

determine to change the number of sub-flows in the satellite network in an event that performance variation between the service performance information collected in the previous cycle and the service performance information collected in the current cycle is greater than a predetermined threshold value.

* * * * *